(12) United States Patent
Lee et al.

(10) Patent No.: US 9,713,121 B2
(45) Date of Patent: Jul. 18, 2017

(54) APPARATUS AND METHOD FOR CONTROLLING TRANSMISSION OF PUSH MESSAGES

(71) Applicant: Samsung Electronics Co., Ltd., Gyeonggi-do (KR)

(72) Inventors: Ki-Won Lee, Gyeonggi-do (KR); Jae-Hyun Park, Gyeonggi-do (KR); Hey-Young Park, Seoul (KR); Ki-Young Lim, Gyeonggi-do (KR); Woo-Hyuk Jang, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 334 days.

(21) Appl. No.: 14/466,051

(22) Filed: Aug. 22, 2014

(65) Prior Publication Data

US 2015/0245313 A1 Aug. 27, 2015

(30) Foreign Application Priority Data

Feb. 21, 2014 (KR) .................. 10-2014-0020833

(51) Int. Cl.

| G06F 15/16 | (2006.01) |
|---|---|
| H04W 68/10 | (2009.01) |
| G06Q 10/10 | (2012.01) |
| H04L 29/06 | (2006.01) |
| H04L 29/08 | (2006.01) |

(Continued)

(52) U.S. Cl.
CPC .......... *H04W 68/10* (2013.01); *G06Q 10/107* (2013.01); *H04L 65/403* (2013.01); *H04L 67/26* (2013.01); *H04W 4/10* (2013.01)

(58) Field of Classification Search
CPC ... H04L 65/1053; H04L 65/403; H04L 67/26; H04M 3/4234; H04W 76/02; H04W 68/10; H04W 4/10; G06Q 10/02; G06Q 50/12
USPC .................. 709/206–207, 223–229, 250
See application file for complete search history.

(56) References Cited

U.S. PATENT DOCUMENTS

| 8,195,240 B2 | 6/2012 | Jin et al. |
|---|---|---|
| 8,665,772 B2 | 3/2014 | Yang et al. |
| 8,965,985 B2 | 2/2015 | Fan et al. |

(Continued)

OTHER PUBLICATIONS

International Search Report dated Feb. 27, 2015 in connection with International Application No. PCT/KR2014/012481; 3 pages.

(Continued)

*Primary Examiner* — Zarni Maung (57) ABSTRACT

An apparatus and method for controlling a transmission timing of push messages in a system that provides a location-based push service. An electronic device transfers its own network information to a push server when connecting to the push server. The push server classifies electronic devices based on network information. At startup, the push server divides the electronic devices classified based on the network information into a plurality of groups, each including a predetermined number of electronic devices, and transmits push messages per unit of the groups. The push server measures a response time period taken to receive acknowledge messages in response to the push messages in a group, and adjust a waiting time for correcting a transmission time of push messages based on the response time period. The push server transmits push messages to electronic devices of the next group based on the adjusted waiting time.

20 Claims, 7 Drawing Sheets

(51) Int. Cl.
*H04W 4/10* (2009.01)
*G06F 12/00* (2006.01)

(56) References Cited

U.S. PATENT DOCUMENTS

| | | |
|---|---|---|
| 2006/0148467 A1 | 7/2006 | Kreitzer et al. |
| 2009/0034474 A1* | 2/2009 | Yavuz ................... H04L 1/0007 370/331 |
| 2012/0033605 A1 | 2/2012 | Yang et al. |
| 2012/0066330 A1 | 3/2012 | Fan et al. |
| 2012/0147887 A1* | 6/2012 | Fan ..................... H04L 12/1868 370/390 |
| 2012/0295617 A1* | 11/2012 | Anchan ............... H04W 76/005 455/435.1 |
| 2013/0039208 A1* | 2/2013 | Jonsson .............. H04L 41/0816 370/252 |
| 2013/0086207 A1 | 4/2013 | Lee |
| 2013/0337860 A1 | 12/2013 | Xu et al. |
| 2014/0369188 A1* | 12/2014 | Seleznyov ............ H04W 4/001 370/229 |
| 2015/0289141 A1* | 10/2015 | Ghasemzadeh ....... H04W 16/14 370/330 |

OTHER PUBLICATIONS

Written Opinion of International Searching Authority dated Feb. 27, 2015 in connection with International Application No. PCT/KR2014/012481; 4 pages.

* cited by examiner

APPARATUS AND METHOD FOR CONTROLLING TRANSMISSION OF PUSH MESSAGES

CROSS-REFERENCE TO RELATED APPLICATION AND CLAIM OF PRIORITY

The present application is related to and claims the benefit under 35 U.S.C. §119(a) of a Korean patent application filed in the Korean Intellectual Property Office on Feb. 21, 2014 and assigned Serial No. 10-2014-0020833, the entire disclosure of which both of which is incorporated herein by reference.

TECHNICAL FIELD

The present disclosure relates generally to an apparatus and method for controlling a transmission timing of push messages when a server provides the push messages to electronic devices.

BACKGROUND

With popularization of electronic devices, such as smart phones and tablet computers, a push service is used for various purposes. A push service is aimed at sending a specific message or notification to electronic devices. The push service sends a message or notification to each application being executed in an electronic device on the mobile platform while maintaining public network connectivity.

Examples of such a push service include a location-based marketing service, a location-based notification service, and a location-based broadcast service, and particularly, the location-based broadcast service is widely used for various purposes. In the push service, in order to ensure transmission of messages or notifications, a push server needs to be logically connected to electronic devices.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method and apparatus for controlling transmission of push messages that are to be sent to electronic devices located in a predetermined range, according to the status of a wireless network, so that the flooding of push messages does not occur at a specific time.

Certain embodiments of the present disclosure provide a method and apparatus for transmitting push messages in units of a predetermined group based on information about a network to which electronic devices belong.

Certain embodiments of the present disclosure provide a method of controlling transmission of push messages in a push server, including: grouping a plurality of electronic devices into one or more groups with reference to at least one table associated with the plurality of electronic devices; transmitting the push messages to one or more electronic devices of a predetermined group; selecting one or more electronic devices of a next group from among the plurality of electronic devices, with reference to the at least one table; adjusting a waiting time after which the push messages are transmitted to the electronic devices of the next group; and transmitting the push messages to the electronic devices of the next group after waiting for the adjusted waiting time.

Certain embodiments of the present disclosure provide a push server for controlling transmission of push messages, including: a message transceiver configured to transfer push messages to a plurality of electronic devices, and to receive an acknowledge message in response to the push messages; a network identification information collector configured to collect network identification information of the plurality of electronic devices, to classify the plurality of electronic devices based on the network identification information, and to store the results of the classification as at least one table; and a timing controller configured to divide the plurality of electronic devices into one or more groups based on the at least one table, to transmit the push messages to one or more electronic devices of a predetermined group, to adjust a waiting time after which the push messages are transmitted to one or more electronic devices of a next group, and to transmit the push messages to the electronic devices of the next group after waiting for the adjusted waiting time.

Other aspects, advantages, and salient features of the disclosure will become apparent to those skilled in the art from the following detailed description, which, taken in conjunction with the annexed drawings, discloses embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, the present disclosure will be described with reference to the appended drawings. However, specific structural and functional details disclosed herein are merely representative for purposes of describing example embodiments of the present disclosure, however, example embodiments of the present disclosure may be embodied in many alternate forms and should not be construed as limited to example embodiments of the present disclosure set forth herein.

Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure. Like numbers refer to like elements throughout the description of the figures.

It will be understood that the terms "comprises", "may comprise,", "includes" and/or "may include", when used herein, specify the presence of stated functions, operations, and/or components, but do not preclude the presence or addition of one or more other functions, steps, and/or components. It will be further understood that the terms "comprises" or "has", when used herein, specify the presence of stated features, integers, steps, operations, elements, components and/or groups thereof, but do not preclude the presence or addition of one or more other features, integers, steps, operations, elements, components, and/or groups thereof.

As used herein, the term "and/or" includes any and all combinations of one or more of the associated listed items. For example, "A and/or B" may include A, B, or both A and B.

It will be understood that, although the terms first, second, etc. may be used herein to describe various components, these components should not be limited by these terms. For example, the terms do not limit the order and/or importance of the components. These terms are only used to distinguish one component from another. For example, a first user device and a second user device that are user devices indicate different user devices. For example, a first component could be termed a second component, and, similarly, a second component could be termed a first component, without departing from the scope of the present disclosure.

It will be understood that when a component is referred to as being "connected" or "coupled" to another component, it can be directly connected or coupled to the other component or intervening components may be present. In contrast, when a component is referred to as being "directly connected" or "directly coupled" to another component, there are no intervening components present. The terminology used herein is for the purpose of describing particular embodiments only and is not intended to be limiting of the embodiments of this disclosure. As used herein, the singular forms "a", "an" and "the" are intended to include the plural forms as well, unless the context clearly indicates otherwise.

An electronic device according to various embodiments of the present disclosure is a device with communication capabilities. For example, the electronic device can include one or a combination of two or more of various devices such as smart phone, tablet Personal Computer (PC), mobile phone, video phone, e-Book reader, desktop PC, laptop PC, Netbook computer, Personal Digital Assistant (PDA), Portable Multimedia Player (PMP), MP3 player, mobile medical equipment, wearable device (for example, a Head-Mounted-Device (HMD), electronic clothes, electronic clock, wrist watch, electronic bracelet, electronic necklace, electronic Appcessory, or smart watch), home appliance (for example, refrigerator, air conditioner, cleaner, oven, microwave, washer, air purifier and the like), Artificial Intelligence (AI) robot, Television (TV), Digital Versatile Disk (DVD) player, audio equipment, various medical devices (for example, Magnetic Resonance Angiography (MRA), Magnetic Resonance Imaging (MRI), Computed Tomography (CT), medical camcorder, ultrasonic equipment, and the like), navigation device, Global Positioning System (GPS) receiver, Event Data Recorder (EDR), Flight Data Recorder (FDR), set-top box, TV box (for example, Samsung Home-Sync™, Apple TV™, Google TV™, or the like), electronic dictionary, automotive infotainment device, electronic equipment for ship (for example, marine navigation device, gyro compass, and the like), avionics, security equipment, electronic apparel, electronic key, camcorder, game consoles, flat panel display device, electronic picture frame, electronic album, furniture or part of building/structure with communication capabilities, electronic board, electronic signature receiving device, projector, and the like. It will be apparent to those of ordinary skill in the art that the electronic device according to various embodiments of the present disclosure is not limited to the aforementioned devices.

Figure 1:
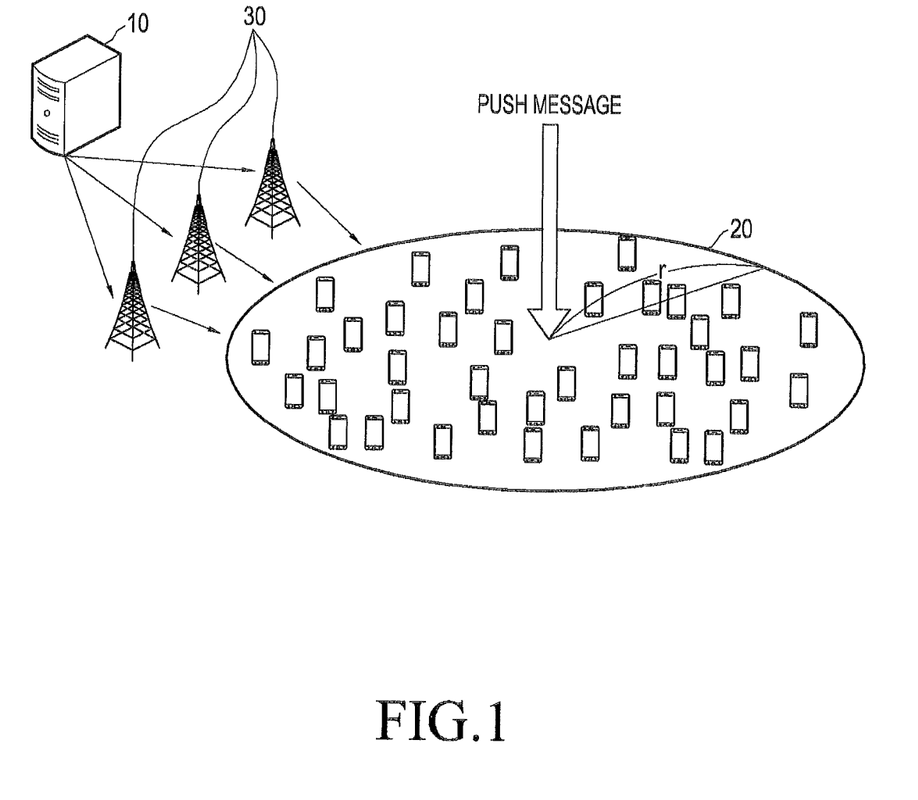
FIG. 1 illustrates an example of a system that supports a location-based push service.

FIG. 1 illustrates an example of a system that supports a location-based push service.

Referring to FIG. 1, the system includes a plurality of electronic devices 20 that are in a specific range r, a server 10 that provides a push service to the electronic devices 20, and a wireless network 30 that connects the electronic devices 20 to the push server 10. The location-based push service can be aggregately provided to the electronic devices 20 that are in the specific range r, through the wireless network 30. Accordingly, wireless network traffic is aggregated in the specific range r, which influences on the wireless network 30.

Figure 2:
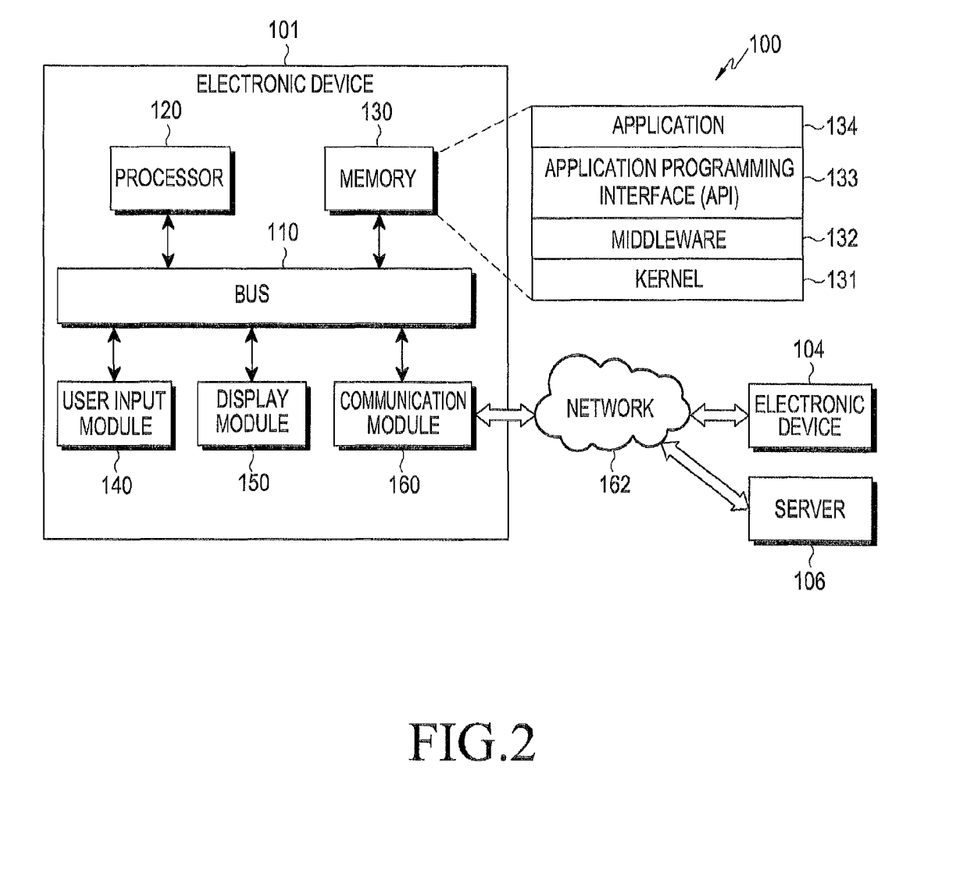
FIG. 2 illustrates a configuration of an electronic device according to embodiments of the present disclosure.

FIG. 2 illustrates a configuration of an electronic device according to embodiments of the present disclosure. Referring to FIG. 2, an electronic device 100 includes a bus 110, a processor 120, a memory 130, a user input module 140, a display module 150, and a communication module 160.

The bus 110 includes a circuit that connects the aforementioned components to each other and that enables communications (for example, transmission of control messages) between the components.

The processor 120 receives, for example, an instruction from the components (for example, the memory 130, the user input module 140, the display module 150, or the communication module 160) through the bus 110, interpret the received instruction, and perform operation or data processing according to the interpreted instruction.

The memory 130 stores instructions or data received from or generated by the processor 120 or the other component (for example, the user input module 140, the display module 150, or the communication module 160). The memory 130 includes programming modules, for example, such as a kernel 131, middleware 132, an Application Programming Interface (API) 133, an application 134 and the like. Each of the programming modules include software, firmware, hardware, or a combination of two or more of the aforementioned devices.

The kernel 131 controls or manages system resources (for example, the bus 110, the processor 120, or the memory 130), which the other programming modules (for example, the middleware 132, the API 133, or the application 134) use to execute their operations or functions. Also, the kernel 131 provides an interface enabling the middleware 132, the API 133, or the application 134 to access individual components of the electronic device 100 and to control or manage the components.

The middleware 132 acts as an intermediary so that the API 133 or the application 134 can communicate with the kernel 131 to receive/transmit data from/to the kernel 131. Also, the middleware 132 performs, when operation requests are received from the application 134 (or a plurality of applications 134), load balancing for the operation requests, for example, by allocating priority capable of using a system resource (for example, the bus 110, the processor 120, or the memory 130) of the electronic device 100 to the application 134 (at least one of the plurality of applications 134).

The API 133 includes an interface that enables the application 134 to control functions that are provided by the kernel 131 or the middleware 132. The API 133 includes at least one interface or function, for example, for file control, window control, image processing, character control, and the like.

The user input module 140 receives an instruction or data, for example, from a user, and transfer the received instruction or data to the processor 120 or the memory 130 through the bus 110. The display module 150 displays images, video, or data for a user.

The communication module 160 enables the electronic device 100 to communicate with another electronic device 104. The communication module 160 supports a predetermined short-range communication protocol (for example, wireless fidelity (WiFi), Bluetooth (BT), Near Field Communication (NFC) or the like), or a predetermined network communication (for example, Internet, Local Area Network (LAN), Wire Area Network (WAN), telecommunication network, cellular network, satellite network, Plain Old Telephone Service (POTS) or the like) 162. The electronic device 104 includes a device that is identical to or different from the electronic device 100. For example, the electronic device 104 includes the same kind of device as the electronic device 100 or a different type of device from the electronic device 100.

Hereinafter, an apparatus and method for controlling a transmission timing of push messages in a system that provides a location-based push service, according to various embodiments of the present disclosure, will be described. In order for a push server 106 to control a transmission timing of push messages, an electronic device 100 transmits its own network information to the push server 106 when connecting to the push server. Accordingly, the push server 106 classifies electronic devices 100, 104 according to network information. Thereafter, when a push service starts, the push server 106 divides the electronic devices classified according to network information into several groups, and transmits push messages in units of groups. Thereafter, the push server 106 measures the response time period taken to receive acknowledge messages in response to the push messages, for each group, and adjust a waiting time for correcting a transmission time of push messages based on the measured response time period. Then, the push server 106 transmits push messages to electronic devices of the next group after waiting for the adjusted waiting time. Thereby, the push server 106 can achieve transmission of push messages optimized according to the state of a wireless network.

Figure 3:
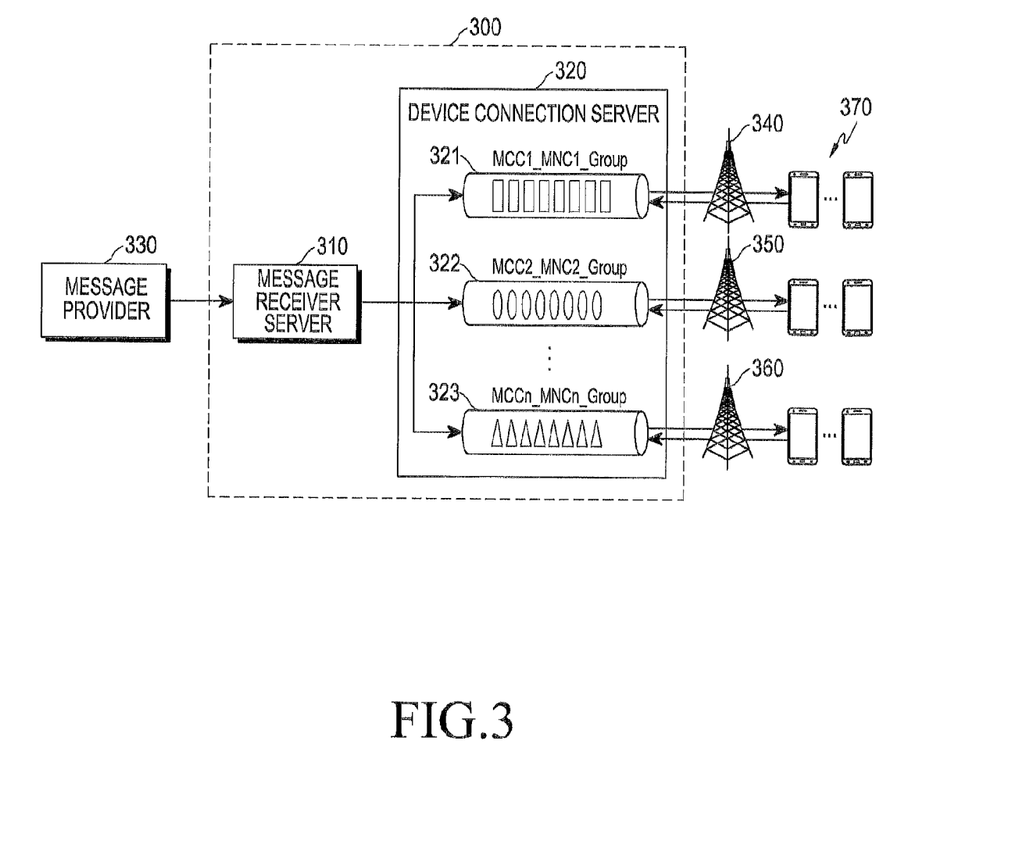
FIG. 3 shows a system that provides a location-based push service, according to embodiments of the present disclosure.

FIG. 3 shows a system that provides a location-based push service, according to embodiments of the present disclosure.

Referring to FIG. 3, a system of providing a location-based push service includes a message provider 330, a push server 300, wireless networks 340, 350, and 360, and a plurality of electronic devices 370. In FIG. 3, one push server 300 is shown, however, there can be a plurality of push servers that provide push services.

The message provider 330 functions to generate push messages that are to be broadcasted. The message provider 330 can be a push service provider. Also, the message provider 330 can be any service server that can provide emergency information. An example of a push service can be a message provided by a Cell Broadcast message Service (CBS) server or an Earthquake and Tsunami Warning Service (ETWS) server that provides emergency and disaster information when a disastrous situation (for example, typhoon, tsunami, earthquake or the like) of emergency has occurred. However, the push service is not limited to this. An example of a push service that is provided by a marketing company can be a discount coupon, or a notification message such as guide information, which is provided to all electronic devices located in a predetermined range from a specific store.

The electronic devices 370 transmit or receive radio signals through base stations of the wireless networks 340, 350, and 360. The electronic devices 370 receive network identification information from the wireless networks 340, 350, and 360. The network identification information includes a Mobile Country Code (MCC) and a Mobile Network Code (MNC). The MNC is network provider information. For example, the MNC includes network operator information.

The electronic device 370 includes a module that can connect to the wireless Internet, and transmit network identification information to the push server 300. In order for each electronic device 370 to receive a push message from the push server 300, the electronic device 370 needs to register itself in the push server 300. During the registration, the electronic device 370 is authenticated, and if the authentication is successful, the electronic device 370 can access the push server 300, and receive a push message from the push server 300. According to certain embodiments, the electronic device 370 provides the network identification information to the push server 300 when connecting to the push server 300. According to certain embodiments, the electronic device 370 provides the network identification information to the push server 300 when registering itself in the push server 300 for authentication. According to certain embodiments, when network identification information is provided to the electronic device 370, identification information of the electronic device 370 is provided to the push server 300. There may be a plurality of push servers 300. Among the plurality of push servers 300, a push server corresponding to a region in which the electronic device 370 is located is allocated to the electronic device 370.

In order to receive a push message, the electronic device 370 needs to be logically connected to the push server 300. Accordingly, the electronic device 370 operates to independently maintain a session with the push server 300.

The push server 300 includes a message receiver server 310 and a device connection server 320. The message receiver server 310 and the device connection server 320 can be referred to as a Rational Quality Manager (RQM) and a Connection Manager (CM), respectively, and be implemented as devices or modules.

The message receiver server 310 receives push messages that are to be broadcasted, from the message provider 330, and transfer the push messages to the device connection server 320.

The device connection server 320 transmits the push messages received from the message receiver server 310 to electronic devices 370 divided into several groups through the wireless networks 340, 350, and 360. The wireless networks 340, 350, and 360 include communication networks that connect the electronic devices 370 to the push server 300. The wireless networks 340, 350, and 360 correspond to different network operators, respectively.

The device connection server 320 stores, if receiving network identification information from the electronic devices 370, the network identification information together with connection information of the electronic devices 370. At this time, the device connection server 320 maps the network identification information to the connection information of the electronic devices 370 after classifying the electronic devices 370 according to the network identification information, and store the results of the mapping. For example, the device connection server 320 groups electronic devices having the same MCC and the same MNC to configure a table (or database). For example, the device connection server 320 groups electronic devices having a MCC "MCC1" and a MNC "MNC1" to configure a table 321, and group electronic devices having a MCC "MCC2" and a MNC "MNC2" to configure another table 322. Likewise, the device connection server 320 groups electronic devices having a MCC "MCCn" and a MNC "MNCn" to configure another table 323.

As such, each of the tables 321, 322, and 323 can be configured to include a plurality of electronic devices. Also, the plurality of electronic devices in each of the tables 321, 322, and 323 are grouped in units of a predetermined number of electronic devices. Herein, a size of each group, that is, the number of electronic devices that are included in each group is selected according to Quality of Service (QoS) of push messages. The grouping of electronic devices is performed when connection information of electronic devices is mapped to network identification information and stored, or when push messages are transmitted.

Accordingly, when the device connection server 320 transmits push messages to a plurality of electronic devices listed in each of the tables 321, 322, and 323, the device connection server 320 divides the plurality of electronic devices listed in each of the tables 321, 322, and 323 into several groups each including a predetermined number of electronic devices, and transmit push messages to each group. Then, the device connection server 320 measures a response time period taken to receive acknowledge messages responding to the push messages from the corresponding electronic devices, and determines whether the measured response time period is equal to or longer than a reference time period (or whether the measured response time period exceeds the reference time period) or whether the measured response time period is equal to or shorter than the reference time period (or whether the measured response time period does not exceed the reference time period). The device connection server 320 adjusts a waiting time for correcting a transmission time of push messages for the next group, according to the result of the determination. The timing adjustment is performed whenever push messages are transmitted, and the device connection server 320 transmits push messages in units of groups based on the adjusted waiting time.

A configuration and operations of the push server 300 having the above-described functions will be described in detail with reference to FIG. 4, below.

Figure 4:
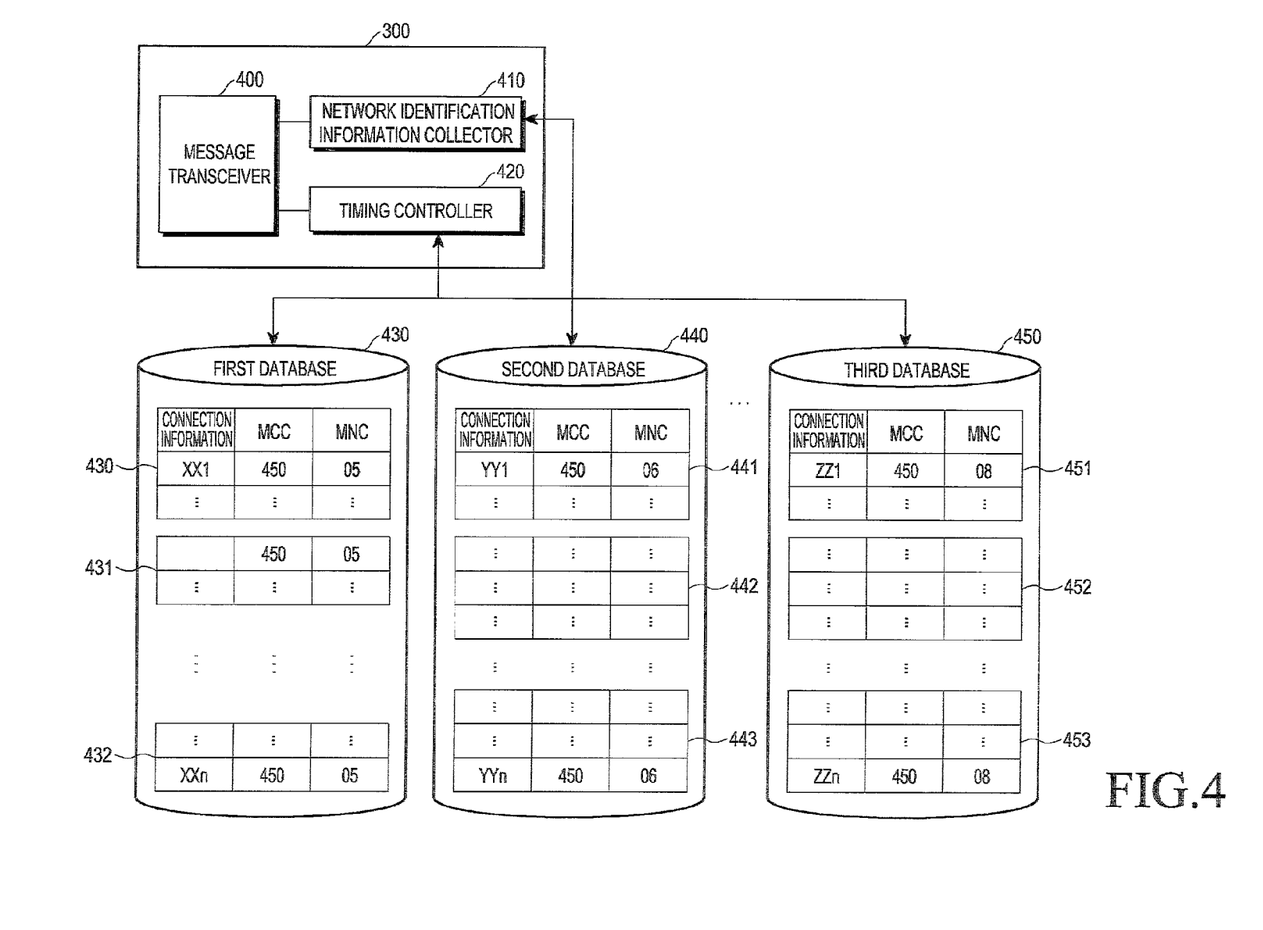
FIG. 4 illustrates a configuration of a push server according to embodiments of the present disclosure.

FIG. 4 illustrates a configuration of the push server 300 according to embodiments of the present disclosure.

Referring to FIG. 4, the push server 300 includes a message transceiver 400, a network identification information collector 410, and a timing controller 420.

The message transceiver 400 transmits push messages to electronic devices, and receives acknowledge messages responding to the push messages from the electronic devices. Also, the message transceiver 400 receives connection request messages from electronic devices.

The network identification information collector 410 acquires network identification information through a base station in a wireless network in which an electronic device is located. The network identification information collector 410 acquires network identification information from a connection request message received from an electronic device, or from a base station in a wireless network. In embodiments of the present disclosure, a case in which the network identification information collector 410 collects network identification information including a MCC and a MNC is described, however, the network identification information collector 410 can collect any information such as Public Land Mobile Network (PLMN) information, which can be used to identify a region in which an electronic device is located and a network operator.

The network identification information collector 410 checks, when receiving a connection request from an electronic device, network identification information included in the connection request. Since electronic devices have their unique identification information, the network identification information collector 410 classifies electronic devices according to network identification information to store the network identification information in the form of tables or databases.

As shown in FIG. 4, in first, second, and third databases 430, 440, and 450 classified according to network identification information, such as connection information of electronic devices, is mapped to network identification information. Herein, the connection information of the electronic devices includes information about session connections with the push server 400. According to certain embodiments, the connection information of the electronic devices includes identification information of the electronic devices, which enables the push server 400 to identify targets to which push messages are to be broadcasted. The identification information of the electronic devices includes unique identifiers (IDs) or model names of the electronic devices.

As shown in FIG. 4, the first database 430 stores information about a plurality of electronic devices. For example, if the first database 430 stores information about electronic devices that use a network of a network operator "SKT" in a region "Korea", the first database 430 can be configured by mapping connection information of electronic devices having a MCC "450" and a MNC "05" to network identification information of the electronic devices.

Also, the second database 440 can be configured by mapping connection information of electronic devices having a MCC "450" and a MNC "06" to network identification information of the electronic devices.

Also, the third database 450 can be configured by mapping connection information of electronic devices having a MCC "450" and a MNC "08" to network identification information of the electronic devices.

As described above, the first database 430 stores information about a plurality of electronic devices, and the plurality of electronic devices are divided into a plurality of groups 430, 431, and 432. Also, a plurality of electronic devices in the second database 440 are be divided into a plurality of groups 441, 442, and 443, and a plurality of electronic devices in the third database 450 are also be divided into a plurality of groups 451, 452, and 453.

Operation of dividing a plurality of electronic devices into a predetermined number of groups can be performed when push messages are transmitted. For example, if push messages that are to be transmitted are emergency push messages that are to be sent when a disastrous situation of emergency has occurred, it will be important to quickly transfer push messages to all electronic devices that are in the corresponding region. In this case, by maximizing a group size and transmitting push messages in unit of a group at shortest time intervals, push messages can be quickly broadcasted. Therefore, a size of a group to which push messages are transmitted, and a time interval at which push messages are transmitted can be decided according to QoS of the push messages, including the purpose or kind of the push messages.

The timing controller 420 divides a plurality of electronic devices into a predetermined number of groups with reference to the databases 430, 440, and 450. More specifically, the timing controller 420 groups a plurality of electronic devices into one or more groups with reference to the databases 430, 440, and 450 associated with the plurality of electronic devices.

Successively, the timing controller 420 selects a group from the databases 430, 440, and 450, and control the message transceiver 400 to transmit push messages to electronic devices of the selected group. At this time, connection information of the electronic devices of the selected group is used to simultaneously broadcast the push messages to the electronic devices through the message transceiver 400. Then, the timing controller 420 selects electronic devices of a next group with reference to the databases 430, 440, and 450.

According to an embodiment, the timing controller 420 adjusts a waiting time for correcting a transmission time of push messages, before transmitting the push messages to the electronic devices of the next group. Accordingly, the timing controller 420 transmits the push messages to the electronic devices of the next group after waiting for the adjusted waiting time.

In order to adjust a waiting time, the timing controller 420 sets a waiting time, based on an acknowledge message responding to a push message, received from at least one electronic device among electronic devices of any group. More specifically, the timing controller 420 measures response time periods from when push messages are transmitted to a selected group to when acknowledge messages are received from individual electronic devices of the selected group. At this time, the timing controller 420 calculates an average value of the response time periods, when the acknowledge messages are completely received from all the electronic devices.

Successively, the timing controller 420 adjusts the set waiting time according to the result of the calculation, and then transmit push messages to the next group after waiting for the adjusted waiting time. A waiting time is set depending on QoS of push messages. That is, a waiting time is set depending on the purpose of a service that sends push messages. For example, a waiting time, that is, an initial waiting time of emergency and disaster messages needs to be set to a very short time since the emergency and disaster messages are aiming at informing an emergency situation as soon as possible, and an initial waiting time of messages such as shopping notifications can be set to a relatively longer time than that of emergency and disaster messages.

For example, the timing controller 420 controls the message transceiver 400 to transmit push messages to the first group 430 of the first database 430, to the first group 441 of the second database 440, and to the first group 451 of the n-th database 450. If push messages are initially transmitted for comparing response time periods, the push messages can be again transmitted. In this case, the previous response time period is compared to the current response time period. If the previous response time period is longer than the current response time period, this means that the status of a wireless network becomes better, and accordingly, the timing controller 420 reduces the set waiting time. At this time, a reduction amount of the waiting time can be determined according to the kind of the push messages, the status of the wireless network, etc. Meanwhile, if the current response time period is longer than the previous response time period, this means that the status of the wireless network becomes worse, and accordingly, the timing controller 420 increases the set waiting time.

The above-described example relates to a case of successively transmitting push messages two times in order to acquire response time periods to be compared to each other. However, it is also possible to transmit push messages, to calculate a response time period for next push messages after waiting for a set waiting time, and to reflect the calculated response time period to adjust the set waiting time.

Accordingly, the timing controller 420 wait for a waiting time adjusted according to the result of comparison between response time periods, and then, transfer push messages to the first group 431 of the first database 430, to the first group 442 of the second database 440, and to the first group 453 of the n-th database 450. Successively, the timing controller 420 can again calculate a response time period for transmission of push messages, and then adjust a transmission time of push messages such that the adjusted waiting time is reduced if the calculated response time period is longer than the previous response time period. Also, if the calculated response time period is shorter than the previous response time period, the timing controller 420 adjusts a transmission time of push messages such that the adjusted waiting time increases. As such, timing adjustment by the timing controller 420 can be performed whenever push messages are transmitted, and push messages can be simultaneously transmitted in units of a group based on the adjusted timing.

Figure 5:
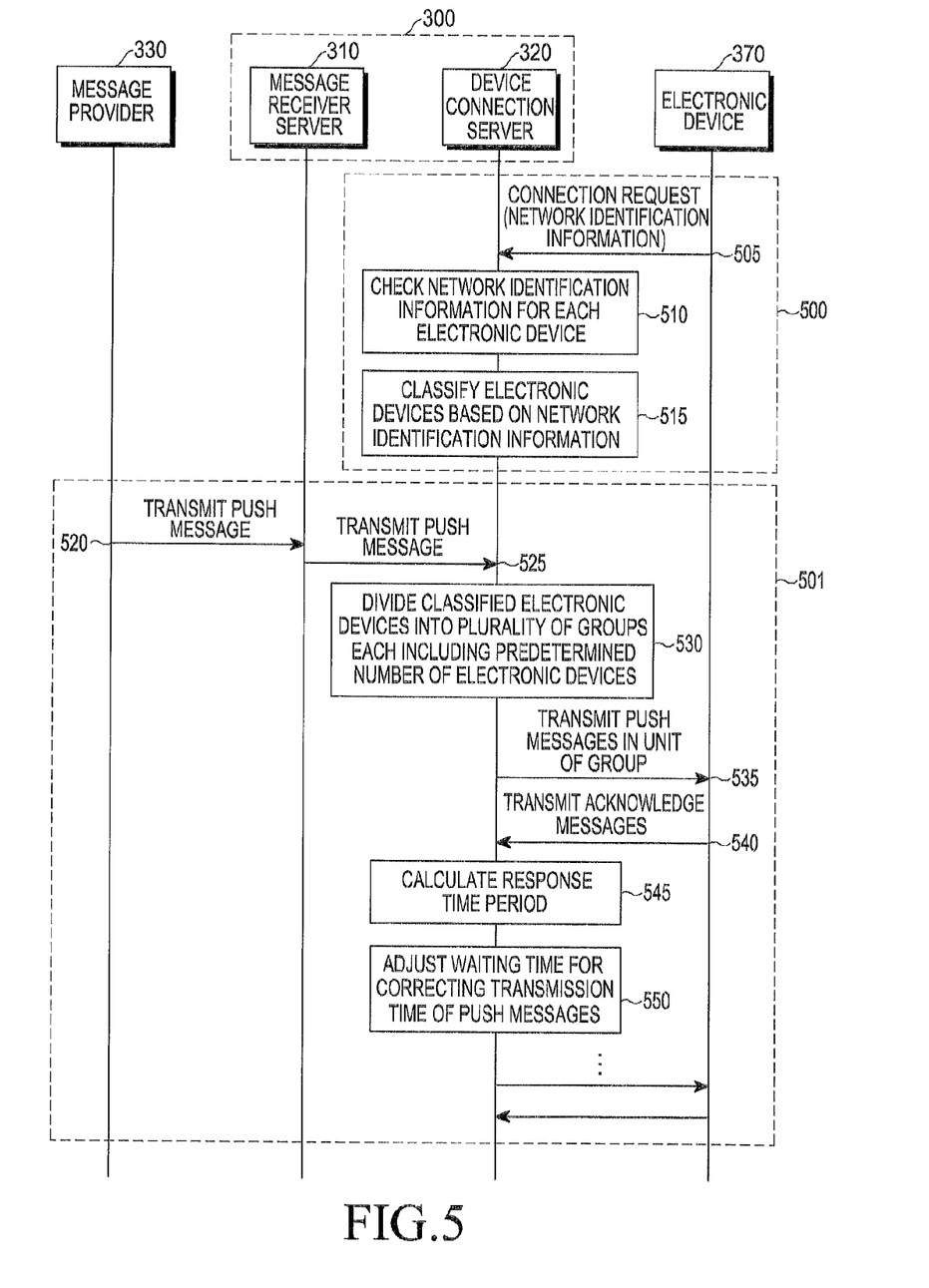
FIG. 5 illustrates a method of controlling transmission of push messages, according to embodiments of the present disclosure.

FIG. 5 illustrates a method of controlling transmission of push messages, according to embodiments of the present disclosure.

Referring to FIG. 5, a method of controlling transmission of push messages is largely classified into a connection process 500 and a service process 501. The electronic device 370 has already been authenticated for establishing a session with the push server 300. The electronic device 370 can represent a plurality of electronic devices.

The connection process 500 is performed when the electronic device 370 sends a connection request to the device connection server 320 in the push server 300, particularly, when the electronic device 370 initially connects to the push server 300 in order to use a push service, or when the electronic device 370 again connects to the push server 300 after temporary disconnection with the push server 300. In this case, the electronic device 370 sends a connection request to the device connection server 320 in order to connect to the push server 300, in communication 505. The connection request includes network identification information for the electronic device 370. The device connection server 320 checks network identification information for each electronic device 370, in operation 510, and then classifies the electronic devices 370 based on the network identification information, in operation 515. When the push server 300 establishes a session with the electronic device 370, the push server 300 acquires session connection information allocated to the electronic device 370. Accordingly, the push server 300 can map session connection information of each of the classified electronic devices 370 to network identification information of the corresponding electronic device 370, and store the results of the mapping.

The service process 501 starts when the message receiver server 310 receives push messages from the message provider 330, in operation 520. Then, the message receiver server 310 transfers the push messages to the device connection server 320. The device connection server 320 divides the classified electronic devices 370 into a plurality of groups, each including a predetermined number Of electronic devices, in operation 530. At this time, the device connection server 320 determines a size of a group, and a transmission time interval of push messages, based on the purpose and kind of the push messages. The transmission time interval of push messages can be a set waiting time. Successively, the device connection server 320 transmits push messages in units of groups, in operation 535, receives acknowledge messages in response to the push messages, in operation 540, and calculates a response time period taken to receive the acknowledge messages, in operation 545. Thereafter, the device connection server 320 adjusts a waiting time for correcting a transmission time of push messages, based on the calculated response time period, in operation 550. The timing adjustment is performed whenever push messages are transmitted, and push messages can be simultaneously transmitted in units of groups based on the adjusted waiting time. Accordingly, the device connection server 320 transmits push messages to the next group, after waiting for the adjusted waiting time.

A method in which the push server 300 transmits push messages based on the adjusted waiting time will be described in detail with reference to FIG. 6, below.

Figure 6:
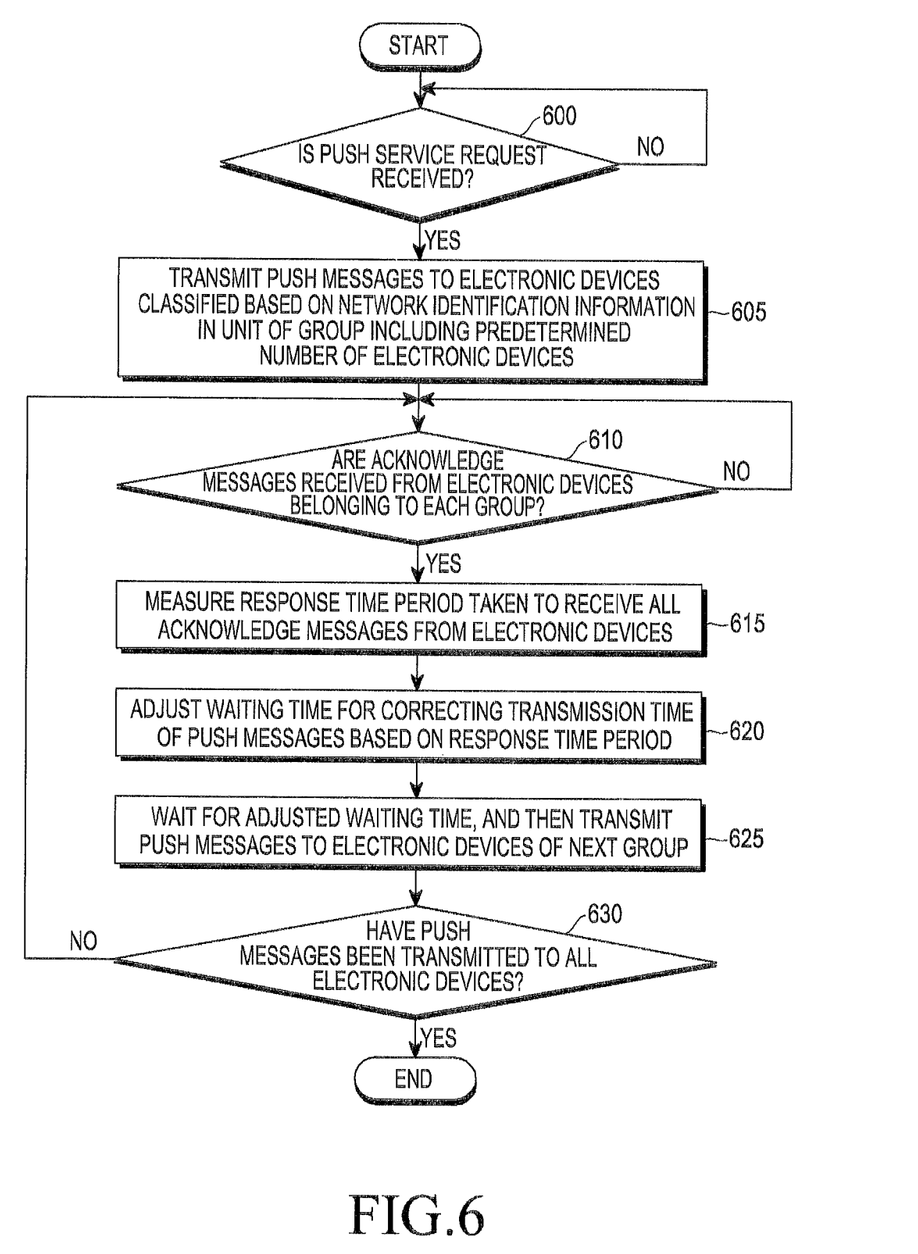
FIG. 6 illustrates a method of controlling transmission of push messages in a push server, according to a embodiments of the present disclosure.

FIG. 6 illustrates a method of controlling transmission of push messages in the push server 300, according to embodiments of the present disclosure.

Referring to FIG. 6, if a push service request is received in operation 600, a push server transmits push messages to electronic devices classified based on network identification information, in units of groups including a predetermined number of electronic devices, in operation 605. Thereafter, the push server determines whether acknowledge messages are received from electronic devices belonging to each group, in operation 610. If the push server determines that acknowledge messages have been received from all electronic devices belonging to the group, the push server measures a response time period taken to receive all the acknowledge messages from the electronic devices, in operation 615. If push messages are initially transmitted for comparing response time periods, the push messages can be again transmitted. In this case, the previous response time period is compared to the current response time period.

Successively, the push server adjusts the waiting time for correcting a transmission time of push messages, based on the response time period, in operation 620. Herein, the timing adjustment based on the response time period can be performed according to the result of comparison between the previous response time period and the current response time period. Thereafter, the push server waits for the adjusted waiting time, and then transmits push messages to electronic devices of the next group, in operation 625. Then, the push server determines whether push messages have been transmitted to all electronic devices of that next group, in operation 630, and if the push server determines whether push messages have been not transmitted to all electronic devices of that next group, the push server returns to operation 610 to repeat the above-described operations.

Figure 7:
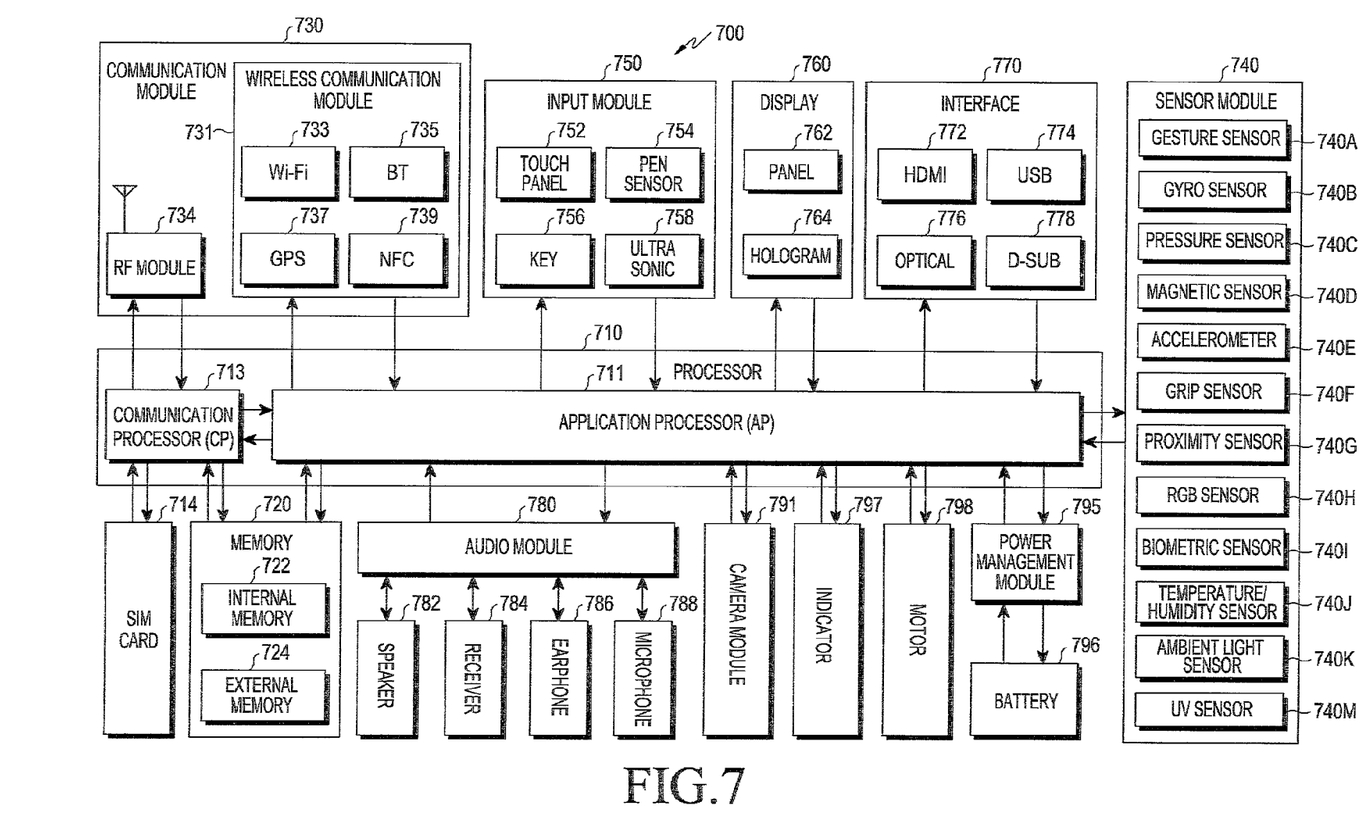
FIG. 7 illustrates a configuration of hardware according to embodiments of the present disclosure.

FIG. 7 illustrates a configuration of hardware according to embodiments of the present disclosure.

Hardware 700 of FIG. 7 is example of the electronic device 100 of FIG. 2. Referring to FIG. 7, the hardware 700 includes at least one processor 710, a Subscriber Identification Module (SIM) card 714, a memory 720, a communication module 730, a sensor module 740, a user input module 750, a display module 760, an interface 770, an audio codec 780, a camera module 791, a power management module 795, a battery 796, an indicator 797, and a motor 798.

The processor 710 (for example, the processor 120 of FIG. 2) includes at least one application processor (AP) 711 and at least one communication processor (CP) 713. In FIG. 7, the AP 711 and the CP 713 are shown to be included in the processor 710, however, the AP 711 and the CP 713 can be included in different IC packages, respectively. According to an embodiment, the AP 711 and the CP 713 can be included in the same IC package.

The AP 711 executes an Operating System (OS) or an application program to control a plurality of hardware or software components connected to the AP 711, and to process various data including multimedia data. The AP 711 can be System on Chip (SoC). According to an embodiment, the processor 710 can further include a Graphic Processing Unit (GPU) (not shown).

The CP 713 functions to manage a data link for communication between the electronic device (for example, the electronic device 100) including the hardware 700 and other electronic devices connected to the electronic device 100 through a network, and convert a communication protocol. The CP 713 can also be SoC. According to certain embodiments, the CP 713 can be in charge of at least one part of multimedia control functions. The CP 713 uses, for example, a subscriber identification module (for example, a SIM card 714) to identify and authenticate an electronic device in a communication network. Also, the CP 713 provides a user with services, such as voice call, video call, text message, or packet data.

In addition, the CP 713 controls data transmission/reception of the communication module 730. In FIG. 7, the CP 713, the power management module 795, or the memory 720 is separated from the AP 711, however, according to certain embodiments, the AP 711 can include at least one part (for example, the CP 713) of the power management module 795, and the memory 720.

According to an embodiment, the AP 711 or the CP 713 load a command or data received from at least one of a non-volatile memory or other components connected to the AP 711 or the CP 713, in a volatile memory, and process the command or data. Also, the AP 711 or the CP 713 store data received from or created by at least one of other components, in a non-volatile memory.

The SIM card 714 corresponds to a subscriber identification module. The SIM card 714 can be inserted into a slot formed at a predetermined location of the electronic device. The SIM card 714 includes unique identification information (for example, Integrated Circuit Card Identifier (ICCID)) or subscriber information (for example, International Mobile Subscriber Identity (IMSI)).

The memory 720 can include an internal memory 722 and an external memory 724. The memory 720 can be the memory 130 of FIG. 2. The internal memory 722 can include a volatile memory (for example, Dynamic Random Access Memory (DRAM), Static RAM (SRAM), Synchronous Dynamic (SDRAM), or the like), or a non-volatile memory (for example, One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, NOR flash memory, or the like). According to certain embodiments, the internal memory 722 can be a Solid State Drive (SSD). The external memory 724 can further include a flash drive (for example, Compact Flash (CF), Secure Digital (SD), Micro Secure Digital (Micro-SD), Mini Secure Digital (Mini-SD), extreme Digital (xD), Memory Stick, or the like).

The communication module 730 includes a wireless communication module 731 and a Radio Frequency (RF) module 734. The communication module 730 can be the communication module 160 of FIG. 2. The wireless communication module 731 can include WiFi 733, BT 735, GPS 737, and NFC 739. For example, the wireless communication module 731 can provide a wireless communication function using a radio frequency. Additionally or alternatively, the wireless communication module 731 can include a network interface (for example, a LAN card) or a modem for connecting the hardware 700 to a network (for example, Internet, LAN, WAN, telecommunication network, cellular network, satellite network, POTS, or the like).

The RF module 734 can control transmission/reception of data, for example, transmission/reception of RF signals or called electronic signals. The RF module 734 includes, for example, a transceiver, a Power Amp Module (PAM), a frequency filter, and a Low Noise Amplifier (LNA), which is not shown in FIG. 6. Also, the RF module 734 can further include an element (for example, a conductor or a conducting line) for transmitting/receiving electromagnetic waves on free space in wireless communication.

The sensor module 740 can include at least one of, for example, a gesture sensor 740A, a gyro sensor 740B, a pressure sensor 740C, a magnetic sensor 740D, an accelerometer 740E, a grip sensor 740F, a proximity sensor 740G, a RGB (Red, Green, Blue) sensor 740H, a biometric sensor 7401, a temperature/humidity sensor 740J, an ambient light sensor 740K and an ultra violet (UV) sensor 740M. The sensor module 740 senses physical quantity or the operating state of the electronic device, and converts the measured or sensed information into electrical signals. In addition, the sensor module 740 can include an E-nose sensor (not shown), an electromyography (EMG) sensor (not shown), an electroencephalogram (EEG) sensor, an electrocardiogram (ECG) sensor, and a fingerprint recognition sensor. The sensor module 740 can further include a control circuit to control at least one sensor included therein.

The user input module 750 can include a touch panel 752, a pen (digital pen) sensor 754, a key 756, and an ultrasonic input device 758. The user input module 750 can be the user input module 140 of FIG. 2. The touch panel 752 can be a capacitive type, a resistive type, an infrared type, or an ultrasonic type. Also, the touch panel 752 can further include a controller (not shown). If the touch panel 752 is a capacitive type, the touch panel 752 recognizes proximity as well as a direct touch input. The touch panel 752 can further include a tactile layer. In this case, the touch panel 752 provides a user tactile impression.

The pen sensor 754 senses a pen touch input using a method that is the same as or similar to the method by which the touch panel 752 receives a touch input from a user. Also, the pen sensor 754 senses a pen touch input using a recognition sheet. The key 756 can be a keypad or a touch key. The ultrasonic input device 758 is a device that identifies data by detecting a sound wave from the electronic device to a microphone (e.g., a microphone 788) through a pen generating an ultrasonic wave signal, and wireless recognition is possible therethrough. The ultrasonic input device 758 enables RF identification (RFID). According to certain embodiments, the hardware 700 receives a user input from an external device (for example, a network, a computer, or a server) connected to the hardware 700, using the communication module 730.

The display module 760 can include a panel 762 and a hologram 764. The display module 760 can be the display module 150 of FIG. 2. The panel 762 can be a Liquid-Crystal Display (LCD) or an Active-Matrix Organic Light-Emitting Diode (AM-OLED). The panel 762 can be implemented to be flexible, transparent, or wearable. The panel 762 can be integrated into the touch panel 752. The hologram 764 can show a 3Dimensional (3D) image in the air using interference of light. According to an embodiment, the display module 760 further includes a control circuit for controlling the panel 762 or the hologram 764.

The interface 770 can include, for example, High-Definition Multimedia Interface (HDMI) 772, a Universal Serial Bus (UBS) 774, a projector 776, and a D-subminiature (D-sub)778. Additionally or alternatively, the interface 770 can include, for example, a Secure Digital (SD)/Multi-Media Card (MMC) (not shown), and an Infrared Data Association (IrDA) (not shown).

The audio codec 780 converts voice into electronic signals and vice versa. The audio codec 780 converts voice information input/output through, for example, a speaker 782, a receiver 784, earphones 786, or the microphone 788, into electrical signals or vice versa.

The camera module 791, which captures still images or moving images, includes one or more images sensors (for example, a front lens or a rear lens), an Image Signal Processor (ISP) (not shown), and a flash LED (not shown).

The power management module 795 manages power of the hardware 700. As not shown in FIG. 6, the power management module 795 includes a Power Management Integrated Circuit (PMIC), a charge Integrated Circuit (IC), and a battery fuel gauge.

The PMIC can be installed in an integrated circuit or a SoC semiconductor. A charging method can be classified into a wired type and a wireless type. The charge IC can charge a battery, and prevent inflow of overvoltage or overcurrent from a charger. According to certain embodiments, the charge IC includes a charge IC for at least one of a wired charging method and a wireless charging method. The wireless charging method can be a magnetic resonance method, a magnetic induction method, or an electromagnetic wave method, and in order to perform the wireless charging method, the charge IC can include additional circuits, for example, a coil loop, a resonance circuit, and a rectifier.

The battery gauge measures, for example, a level of battery 796, and a voltage, a current, or a temperature during charging. The battery 796 generates electricity to supply power. The battery 796 can be a rechargeable battery.

The indicator 797 displays a specific state (for example, a booting state, a message state, or battery level) of the hardware 700 or a part (for example, the AP 711) of the hardware 700. The motor 798 converts electrical signals into mechanical vibration. The MCU 299 controls the sensor module 740.

Although not shown in FIG. 7, the hardware 700 can include a processor (for example, GPU) for supporting a mobile TV. The processor for supporting a mobile TV processes media data according to Digital Multimedia Broadcasting (DMB) standard, Digital Video Broadcasting (DVB) standard, or media flow standard.

Each of the above-described units of the hardware 700 according to the present disclosure can be configured with one or more components, and the units can be termed according to a kind of the corresponding electronic device. The hardware 700 includes at least one of the above-described units. Also, the hardware 700 can omit some of the above-described units or further include another unit(s). Furthermore, some of the units of the hardware 700 can be combined to constitute entity which performs the same functions as the corresponding units.

The term "module" used in the present disclosure may means a unit including, for example, hardware, software, firmware, or a combination thereof. The "module" may be interchangeably used with another term, such as "unit", "logic", "logical block", "component", or "circuit". The "module" may be a minimum unit or a part of components integrated into one body. Also, the "module" may be a minimum unit or a part for performing one or more functions. The "module" may be implemented mechanically or electronically. For example, the "module" may include at least one of an Application-Specific Integrated Circuit (ASIC) chip, Field-Programmable Gate Arrays (FPGAs), or a programmable-logic device, which performs certain operations, already developed or to be developed in future.

According to various embodiments of the present disclosure, since push messages that are to be sent to electronic devices located in a predetermined range are distributively broadcasted adaptively according to the status of a wireless network without bursting at a specific time, wireless network traffic may be minimized.

According to various embodiments of the present disclosure, since push messages can be prevented from bursting at a specific time in a specific region, QoS of a server of providing a push service may be guaranteed.

Although the present disclosure has been described with examples, various changes and modifications may be suggested to one skilled in the art. It is intended that the present disclosure encompass such changes and modifications as fall within the scope of the appended claims.

What is claimed is:

1. A method of controlling transmission of push messages in a push server, comprising:
grouping a plurality of electronic devices into one or more predetermined groups with reference to at least one table associated with the plurality of electronic devices;
transmitting push messages to one or more electronic devices included in a first group of the one or more predetermined groups;
selecting one or more electronic devices of a second group of the one or more predetermined groups with reference to the at least one table;
adjusting a waiting time after transmitting the push messages to the one or more electronic devices included in the first group of the one or more predetermined groups;
waiting for the adjusted waiting time; and
transmitting the push messages to the one or more electronic devices included in the second group of the one or more predetermined groups after the adjusted waiting time.

2. The method of claim 1, wherein the adjusted waiting time is set based on at least one acknowledge message responding to the push messages received from at least one electronic device of the plurality of electronic devices included in the one or more predetenained groups.

3. The method of claim 1, wherein the adjusting of the waiting time comprises:
measuring a response time period taken to receive at least one acknowledge message responding to the push messages from at least one electronic device of the plurality of electronic devices included in the one or more predetermined groups; and
adjusting the waiting time, by increasing or decreasing a set waiting time according to the measured response time period, after transmitting the push messages to the one or more electronic devices included in the first group.

4. The method of claim 3, wherein the set waiting time and a size of each group are selected according to quality of service (QoS) of the push messages.

5. The method of claim 1, wherein the at least one table corresponds to at least one network identification information of the plurality of electronic devices.

6. The method of claim 5, wherein the at least one table is configured by mapping connection information of the plurality of electronic devices to the network identification information.

7. The method of claim 6, further comprising acquiring the network identification information from each of the plurality of electronic devices when a corresponding electronic device is connected to the push server.

8. The method of claim 6, wherein the connection information of the plurality of electronic devices includes information associated with session connections with the push server.

9. The method of claim 5, wherein the network identification information includes a mobile country code (MCC) and a mobile network code (MNC).

10. The method of claim 1, wherein selecting the one or more electronic devices of the second group and transmitting the push messages to the one or more electronic devices included in the second group are repeatedly performed for one or more predetermined number of groups comprising the plurality of electronic devices.

11. A push server of controlling transmission of push messages, comprising:

a message transceiver configured to transmit push messages to a plurality of electronic devices, and to receive at least one acknowledge message in response to the push messages;

a network identification information collector configured to:
  collect network identification information of the plurality of electronic devices;
  classify the plurality of electronic devices based on the network identification information; and
  store results of the classified plurality of electronic device as at least one table; and a timing controller configured to:
  divide the plurality of electronic devices into one or more predetermined number of groups based on the at least one table;
  transmit the push messages to one or more electronic devices included in the one or more predetermined groups
  adjust a waiting time after transmitting the push messages to one or more electronic devices included in a first group of the one or more predetermined groups;
  wait for the adjusted waiting time; and
  transmit the push messages to the one or more electronic devices included in a second group of the one or more predetermined groups after the adjusted waiting time.

12. The push server of claim 11, wherein the timing controller is configured to set the adjusted waiting time based on at least one acknowledge message responding to the push messages received from at least one electronic device included in the one or more predetermined groups.

13. The push server of claim 11, wherein the network identification information includes a mobile country code (MCC) and a Mobile Network Code (MNC).

14. The push server of claim 11, wherein the timing controller is configured to:
  measure a response time period taken to receive at least one acknowledge message responding to the push messages from at least one electronic device of the plurality of electronic devices included in the one or more predetermined groups; and
  adjust the waiting time, by increases or decreases a set waiting time according to the measured response time period, thereby, after transmitting the push messages to the one or more electronic devices included in the first group.

15. The push server of claim 14, wherein the set waiting time and a size of each group are selected according to quality of service (QoS) of the push messages.

16. The push server of claim 11, wherein the timing controller is further configured to:
  measure a first response time period from when the push messages are transmitted to the one or more electronic devices included in the one or more predetermined groups and at least one acknowledge message responding to the push messages is received from at least one electronic device of the one or more electronic devices included in the one or more predetermined group; and
  measure a second response time period from when the push messages are again transmitted to the one or more electronic devices included in the one or more predetermined group and at least one acknowledge message responding to the push messages is received from at least one electronic device of the one or more electronic devices included in the one or more predetermined group.

17. The push server of claim 16, wherein the timing controller is further configured to:
  compare the first response time period to the second response time period;
  decrease a set waiting time if the first response time period is longer than the second response time period; and
  increase the set waiting time if the first response time period is shorter than the second response time period.

18. The push server of claim 11, wherein the at least one table is configured by mapping connection information of the plurality of electronic devices to the network identification information.

19. The push server of claim 18, wherein the connection information of the plurality of electronic devices includes information associated with session connections with the push server.

20. The push server of claim 11, wherein the timing controller is further configured to adjust a waiting time after transmitting the push messages to the one or more electronic devices.

* * * * *